March 21, 1944.  S. C. COEY ET AL  2,344,536
SPACE STERILIZATION
Filed April 5, 1943  3 Sheets-Sheet 1
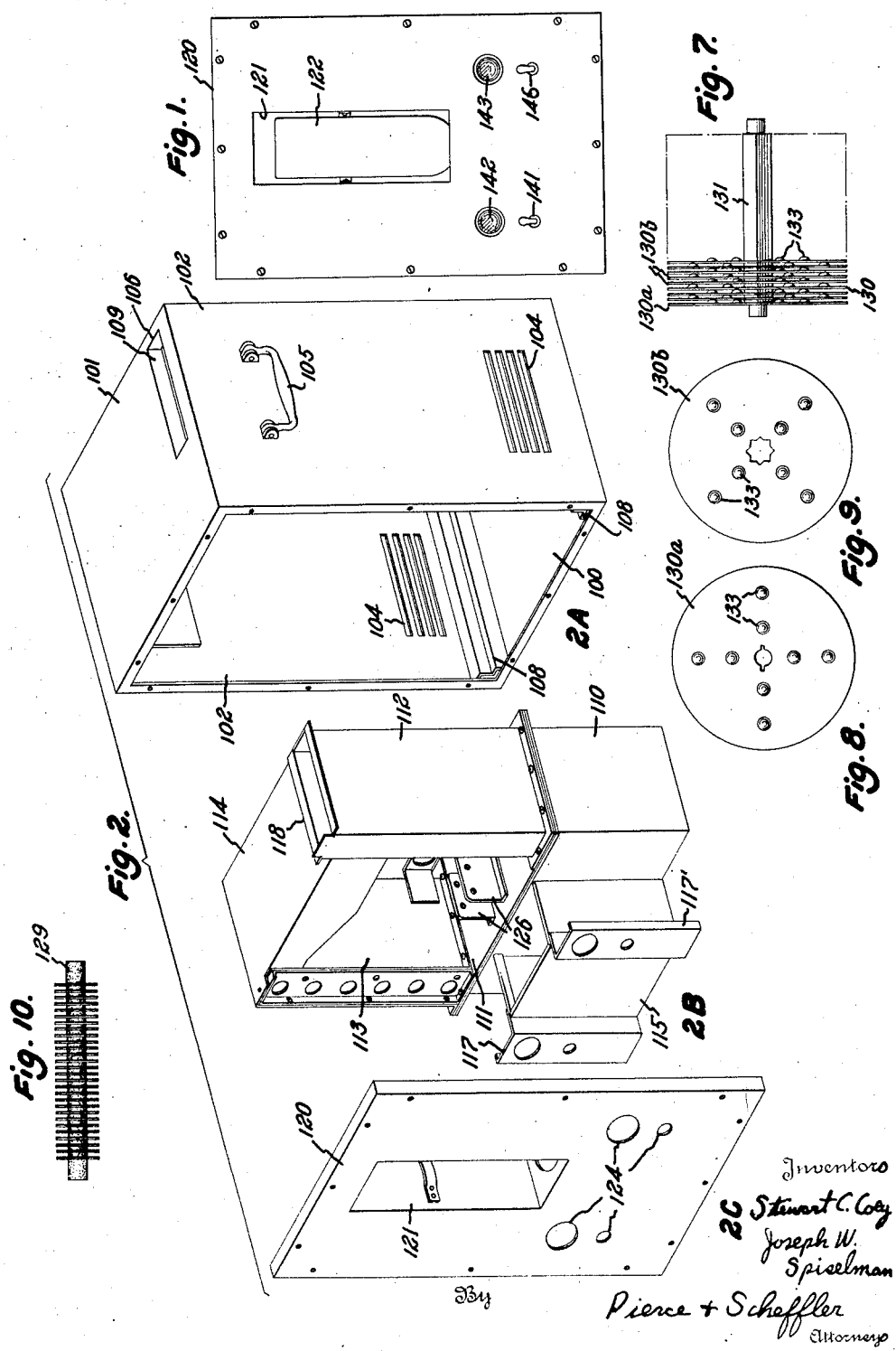
Inventors
Stewart C. Coey
Joseph W. Spiselman
By Pierce + Scheffler
Attorneys

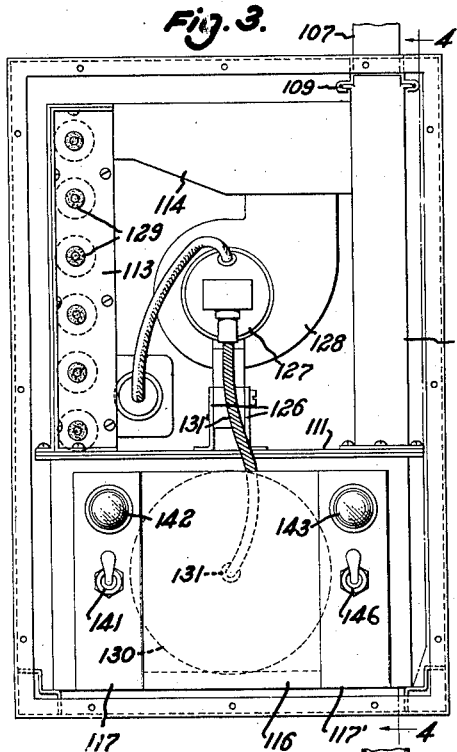

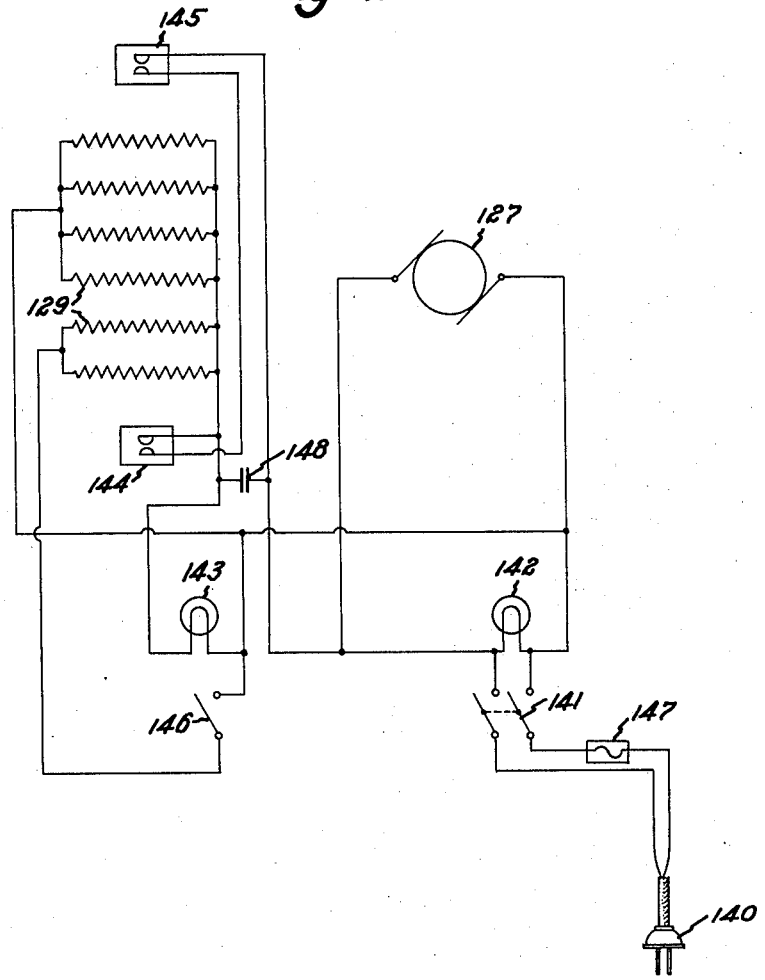

Patented Mar. 21, 1944

2,344,536

UNITED STATES PATENT OFFICE 2,344,536

SPACE STERILIZATION

Stewart C. Coey, Glen Ridge, and Joseph W. Spiselman, Middlesex Borough, N. J., assignors to Research Corporation, New York, N. Y., a corporation of New York Application April 5, 1943, Serial No. 481,918

7 Claims. (Cl. 21—53)

The invention relates to the sterilization of air, particularly the air supplied to structures, such as auditoriums, dormitories, hospitals and the like.

It has been found that by maintaining a substantial concentration of high-boiling polyhydroxy compounds, such as triethylene glycol and propylene glycol, in the air of an occupied structure cross-infection by air-borne disease germs, such as the influenza virus, may be completely prevented. Tests have shown that when the triethylene glycol content of the air approaches the saturation point, for example, 0.354 pound of triethylene glycol per million cubic feet of air at 77° F., such infectious organisms as the disease germs of influenza, pneumonia, and scarlet fever in the air are rapidly rendered innocuous. In general, it has been found to be desirable to maintain a concentration of the polyhydroxy compound of at least 50% of its saturation concentration, although the optimum concentration may vary in dependence upon such factors as the number of people in the occupied space.

Because of the very low vapor pressures of the polyhydroxy compounds, that of triethylene glycol at ordinary temperatures, for example, being only .0007 millimeter of Hg at 77° F., it has been found to be very difficult to maintain a substantial and effective amount of the substance in the air of occupied spaces. Passing the air into contact with extended surfaces of the polyhydroxy compound or spraying the desired amounts of the substance into the air are quite ineffectual to maintain effective concentrations because of the extremely low rate of evaporation of the material at comfort temperatures.

It has been found, however, that by contacting a stream of air with an extended surface of the polyhydroxy compound at a temperature within the range of about 150° F. to 250° F. controllable mixtures of vapor of the compound and air may be produced which contain sufficient proportions of the vapor that admixture thereof with much larger volumes of air results in saturated or substantially saturated mixtures at room or comfort temperatures. For example, if a stream of air is contacted with triethylene glycol at a temperature of 200° F., it is possible to incorporate so much triethylene glycol therein in a relatively short period that the resulting mixture will substantially saturate over 200 times its volume of air at 77° F. without increasing the temperature of the final mixture by as much as 1° F.

It has been found to be particularly advantageous in carrying out the method of the invention to heat the triethylene glycol, for example, contacted with the air stream, solely by transfer of heat thereto, either directly or indirectly, from the preheated air stream. In this manner, the readily controllable temperature of the preheated air stream serves to provide a maximum upper limit to the temperature of the triethylene glycol and thus effectively eliminates all possibility of the local overheating and decomposition of the triethylene glycol.

A principal purpose of the invention is the provision of a method and apparatus for the sterilization of spaces.

A more particular object of the invention is the provision of a method and apparatus for maintaining a predetermined degree of saturation of a polyhydroxy compound, such as triethylene glycol, in the air in a space to be sterilized.

The method of the invention comprises contacting a minor portion of the air to be sterilized, amounting, in general, to between about one-tenth per cent and five per cent of the total air, with an extended surface of a high-boiling bactericidal polyhydroxy compound, such as triethylene glycol, at an elevated temperature of from 150° F. to 250° F. and thereafter admixing the minor portion of the air with the remaining portion of the air to be sterilized. The percentage of the air contacted with the triethylene glycol is preferably inversely proportional to the ratio of the vapor pressure of triethylene glycol at the temperature of the air to be sterilized and its partial vapor pressure in the air at said elevated temperature. If the percentage of saturation of triethylene glycol is to be maintained at less than full saturation the amount of the air stream may be reduced in proportion to the percentage of saturation to be maintained. Preferably, the air stream is heated to the elevated temperature of contact prior to contact with the triethylene glycol and the triethylene glycol is heated solely by transfer of heat thereto from the heated air stream, for example, by means of heat conductive elements extending from the air stream into contact with the triethylene glycol.

Apparatus embodying the principles of the invention advantageously comprises a casing, and enclosed within the casing a reservoir for vaporizable bactericidal liquid, such as triethylene glycol, a vaporizing chamber having a bath in the lower portion thereof supplied with liquid from the reservoir, a plurality of heat conductive members in the vaporizing chamber extending into the bath, means for wetting the surfaces of the heat conductive members above the bath with liquid from the bath, for example, by rotating the members in partial immersion in the bath, a heating chamber, conduit means providing a passage for air from the exterior of the casing successively through the heating chamber and the vaporizing chamber and to the exterior of the casing, and blower means in the air passage.

The invention will be more particularly described with reference to the accompanying drawings representing a space sterilizing unit embodying the principles of the invention.

In the drawings:

Fig. 1 is a front elevation of the space sterilizing unit of the invention;

Fig. 2 is an expanded isometric perspective view of the sterlizing unit including the casing 2A, the chassis 2B, and the front cover 2C;

Fig. 3 is a front elevation of the unit with the front cover removed;

Fig. 4 is a lateral sectional elevation of the unit on line 4—4 of Fig. 3;

Fig. 5 is a sectional elevation of the unit on line 5—5 of Fig. 4;

Fig. 6 is a transverse sectional view of the unit on the line 6—6 of Fig. 4;

Fig. 7 is a partial detail view of the rotating disc vaporizer assembly of the unit;

Figs. 8 and 9 are views of individual discs of the vaporizer assembly;

Fig. 10 is a detail showing a heating element of the heating chamber, and

Fig. 11 is a wiring diagram of the sterlizing unit.

The space sterlizing unit shown in the drawings comprises a casing having a removable front cover and adapted to contain a removable chassis constructed to carry the principal operating elements of the unit.

The casing includes a base 100, top 101, side walls 102, and back 103, permanently fastened together as shown in Fig. 2 to provide a housing for the chassis and associated elements. The side walls 102 are provided with air inlet louvers 104 and handles 105. The top 101 is provided with an outlet opening 106 having a depending extension 109 adapted to receive a suitable conduit 107 leading to the space to be sterilized. At the bottom corners of the casing are provided rail members 108 to receive and carry the chassis. The space between the bottom of the casing and the bottom of the chassis is advantageously filled with heat insulating material, such as fiber glass.

The chassis includes a lower box-like evaporator chamber 110 on which is mounted a cover member 111, having openings at each end thereof communicating with outlet conduit 112 on the one side and with heating chamber 113 on the other. Plenum chamber 114 at the top of the passage communicates with heating chamber 113. Mounted on the front of evaporator chamber 110 is an open-top feed chamber 115, communicating through feed passage 116 with the evaporator chamber. Brackets 117, 117' adapted to carry control and indicating devices are mounted on the feed chamber. The upper end of outlet conduit 112 is provided with a flanged extension 118 adapted to fit into slots in the lower end of depending extension 109 of the roof of the casing. The slots in extension 109 are open at their front ends so that the chassis can be placed in and removed from the casing without disconnecting the casing from any space supply conduit to which it may be connected.

The front cover 120 of the casing is provided with a recessed reservoir chamber 121 accessible from the front for the easy inspection and replacement of liquid reservoir 122, which is advantageously a bottle having an outlet spout 123 projecting downwardly in inverted position into feed chamber 115, the level of the outlet of the spout determining the constant level of the liquid in the feed chamber and in evaporator chamber 110. The cover member is provided with openings 124 positioned to correspond with the control and indicating devices carried by brackets 117, 117' as described hereinafter.

Mounted on brackets 126 in the chassis is a motor 127. The motor is directly connected to blower 128, mounted below the plenum chamber 114 and delivering air thereto.

Heating chamber 113 is provided with a plurality of heating elements 129, which for the purpose of illustration are shown as finned electric resistance elements positioned transversely of the air passage in chamber 113 so that the air passes successively over the heating elements.

Mounted for rotation transversely of the air passage through evaporator chamber 110 is the heat transfer assembly 130 comprising a plurality of discs 130a, 130b, fixed on shaft 131 which is mounted in the rear and front walls of evaporator chamber 110 for rotation by means of flexible shaft 131' from motor 127. The discs comprise circular metallic plates having shallow bosses 133 impressed therein. The center of discs 130b are pierced with a double square opening to fit the square portion of shaft 131. Each alternate disc is displaced 45° so that the position of the bosses alternates by 45° from disc to disc through the assembly. The end discs 130a have a circular control opening to fit the round end portions of shaft 131.

An advantageous wiring diagram of the sterilizing unit is indicated in Fig. 11. In the diagram power supply connection 140 is connected and disconnected by main switch 141 to the unit circuit, energizing motor 127, indicator light 142 and a bank of four heating elements 129 connected in parallel with indicator light 143 through thermostat 144 positioned in the air stream at the lower end of heating chamber 113 and thermostat 145 positioned in the air stream at the upper end of the heating chamber. A further switch 146 throws a bank of two heating elements in and out of connection for high and medium heating requirements respectively. The circuit is protected by fuse 147 and condenser 148.

In operation of the space sterilizing unit the feed and evaporator chambers, 115 and 110, are filled to the level indicated in Fig. 5 with a bactericidal liquid such as triethylene glycol, and a further supply of the liquid is provided in reservoir 122. When the unit is energized by means of switch 141, the blower 128 draws air through louvers 104 around the sides and back of the casing and blows the air through plenum chamber 114, heating chamber 113, evaporator chamber 116, and outlet conduit 112. In passing over the heating elements 129 in the heating chamber, the air is heated to a temperature controlled by the setting of thermostat 144. The preheated air then passes through the evaporator chamber 110 where it contacts the films of triethylene glycol maintained on the rotating disc assembly. Concurrently the triethylene glycol bath in the lower portion of the chamber is heated up to approximately the temperature of the air, in part by direct heat transfer from the air stream but principally by indirect heat transfer from the air stream through the rotating metallic discs of the disc assembly. At temperatures between 150° F. and 250° F. the air is rapidly brought to a substantial degree of saturation with the triethylene glycol and leaves the evaporator chamber through outlet conduit 112 carrying an amount of triethylene glycol sufficient to saturate a much greater amount of air at normal temperatures. The amount of triethylene glycol delivered to the space to be conditioned is subject to control by varying the temperature to which the air in the unit is heated or the amount of air passed through the unit or both. In the apparatus shown by way of example in the drawings, the air stream is drawn in by the blower through the spaces between the sides of the casing and the successive chambers and conduits of the chassis so that the incoming air serves to absorb the heat flowing from the chassis toward the casing and thus substantially eliminates undesirable heat radiation from the casing. However, the air could be drawn directly from outside the casing into the blower and the spaces between the casing and the chassis filled with heat insulating material. The thermostat 145 protects the apparatus from dangerous overheating due to failure of the fan motor or blocking of the air passage by cutting off the current to the heating elements whenever the air at the entrance to the heating chamber reaches a predetermined level, for example, by the backing up of heated air into the plenum chamber.

As a typical example of an operation carried out in accordance with the principles of the invention for the purpose of saturating with triethylene glycol 4,500 cubic feet per minute of air being supplied at 77° F. to a room about 20 cubic feet per minute of air heated at 200° F. is contacted at a velocity of about 400 feet per minute with an extended surface film of triethylene glycol providing about 10 square feet of contact surface. The air stream will carry sufficient triethylene glycol to substantially saturate the 4,500 cubic feet of air per minute without raising its temperature more than about ½° F.

It will be seen that the method and apparatus of the invention provide a useful and efficient means for maintaining an effective concentration of triethylene glycol in a space to be sterilized and it will be evident that the method and apparatus may be varied to a substantial degree without departing from the principles of the invention as defined in the appended claims.

We claim:

1. A method of sterilizing air which comprises contacting a minor portion of the air to be sterilized with an extended surface of triethylene glycol at a temperature of from 150° F. to 250° F. and mixing said minor portion of the air with the remaining portion of the air to be sterilized.

2. A method of sterilizing air which comprises contacting from about one-tenth per cent to about five per cent of the air to be sterilized with an extended surface of triethylene glycol at a temperature of from 150° F. to 250° F. and mixing the said air with the remaining portion of the air to be sterilized.

3. A method of sterilizing air which comprises contacting with an extended surface of triethylene glycol at an elevated temperature of from 150° F. to 250° F. a minor portion of the air to be sterilized, the amount of air in said minor portion being related to the amount of air to be sterilized substantially in the inverse ratio of the vapor pressure of triethylene glycol at the temperature of the air to be sterilized to the partial vapor pressure of the triethylene glycol in the air leaving said extended surface contact, and mixing said minor portion of air with the remaining portion of the air to be sterilized.

4. A method of sterilizing air which comprises contacting with an extended surface of triethylene glycol at an elevated temperature of from 150° F. to 250° F. a minor portion of the air to be sterilized, the amount of air in said minor portion being related to the amount of air to be sterilized substantially in the inverse ratio of the vapor pressure of triethylene glycol at the temperature of the air to be sterilized to the partial vapor pressure of the triethylene glycol leaving said extended surface contact multiplied by the predetermined percentage of saturation with triethylene glycol to be maintained in the air to be sterilized, and mixing said minor portion of air with the remaining portion of the air to be sterilized.

5. In the production of a mixture of triethylene glycol and air by passing a stream of air at a temperature of from about 150° F. to 250° F. into contact with an extended surface of triethylene glycol maintained at a temperature approximately that of the air stream, the method of heating the triethylene glycol which comprises maintaining metallic heat conductive elements in simultaneous contact with the heated air stream and the triethylene glycol.

6. In the production of a mixture of triethylene glycol and air by passing a stream of air at a temperature of from about 150° F. to 250° F. into contact with an extended surface of triethylene glycol maintained at a temperature approximately that of the air stream, the method of heating the triethylene glycol which comprises continuously passing metallic heat conductive elements from direct contact with the heated air stream into direct contact with a bath of the triethylene glycol.

7. A space sterilizing unit comprising a vaporizing chamber having a bath in the lower portion thereof adapted to contain a body of vaporizable bactericidal liquid, a plurality of heat conductive disc members mounted for rotation in said chamber in partial immersion in said bath, a heating chamber, a plurality of heating elements extending transversely across said heating chamber, means for causing a stream of air to pass successively through said heating chamber and said vaporizing chamber, means responsive to the temperature of the air stream leaving said heating chamber for controlling the supply of current to said heating elements, and means responsive to a predetermined temperature in said heating chamber for cutting off the supply of current to said heating elements.

STEWART C. COEY.
JOSEPH W. SPISELMAN.